United States Patent [19]

Yamada et al.

[11] 4,420,444

[45] Dec. 13, 1983

[54] PROCESS FOR FORMING PHOSPHOR POWDER LAYER

[75] Inventors: Hiromichi Yamada, Hino; Atsushi Suzuki; Yoichi Oba, both of Higashiyamato; Yoko Uchida, Kawasaki; Hideki Kohno, Tokyo; Tadashi Fukino, Hachioji; Minoru Yoshida, Tokyo, all of Japan

[73] Assignees: Hitachi, Ltd.; Hitachi Medical Corporation, both of Tokyo, Japan

[21] Appl. No.: 328,623

[22] Filed: Dec. 8, 1981

[51] Int. Cl.$^3$ ............................................... C09K 11/00
[52] U.S. Cl. ................................. 264/21; 252/301.45; 264/319; 264/331.11
[58] Field of Search ...................... 264/21, 319, 331.11; 252/301.6 S, 301.4 S; 423/263

[56] References Cited

U.S. PATENT DOCUMENTS

| Re. 28,340 | 2/1975 | Stewart et al. | 264/21 |
|---|---|---|---|
| 2,840,741 | 6/1958 | Lehmann | 264/21 |
| 3,402,293 | 9/1968 | Shambon | 264/21 |
| 3,471,699 | 10/1969 | McCall | 252/301.36 |
| 3,575,873 | 4/1971 | Carver | 252/301.6 S |
| 3,868,512 | 2/1975 | Prener et al. | 252/301.4 S |
| 4,021,588 | 5/1977 | Royce et al. | 252/301.6 S |
| 4,208,461 | 6/1980 | Vanderpool | 252/301.6 S |
| 4,240,992 | 12/1980 | Petrie et al. | 264/21 |
| 4,309,481 | 1/1982 | Wakatsuki et al. | 252/301.4 S |

FOREIGN PATENT DOCUMENTS 2506182  8/1976  Fed. Rep. of Germany.

*Primary Examiner*—Donald E. Czaja
*Assistant Examiner*—W. Thompson
*Attorney, Agent, or Firm*—Antonelli, Terry & Wands

[57] ABSTRACT

A phosphor powder layer is formed by a process comprising a step of mixing a phosphor powder with a polymer emulsion and drying the mixture to give the phosphor powder coated with the polymer and a step of subjecting the phosphor powder coated with the polymer to heating and pressing. The resulting powder layer is suitable as a scintillator used in a radiation detector, particularly in a radiation detector used in X-ray CT.

13 Claims, No Drawings

PROCESS FOR FORMING PHOSPHOR POWDER LAYER

BACKGROUND OF THE INVENTION

This invention relates to a process for forming a phosphor powder layer, more particularly to a process for forming a phosphor powder layer used as a scintillator.

Heretofore, as a radiation detector used in X-ray CT (computerized tomography), there has been used a detector combining a xenon gas chamber or bismuth germanate with a photomultiplier. But when a large number of radiation detectors having equal performance were necessary as in the case of X-ray CT, it was difficult to adjust characteristics of individual radiation detectors in the case of using such detectors. Particularly in the case of a radiation detector combining bismuth germanate with a photomultiplier, it was very difficult to adjust characteristics of individual radiation detectors due to dispersion in characteristics of monocrystals of the bismuth germanate used as scintillator and dispersion in characteristics of the photomultipliers.

In order to solve this problem, some of the present inventors previously proposed a radiation detector in which phosphor powders (particles) were used as scintillator (U.S. patent appln. Ser. No. 047,133, filed June 11, 1979, now U.S. Pat. No. 4,317,037). For the purpose of obtaining a tomography of high accuracy in a radiation detector for conventional X-ray CT, the width of scintillator is about 1–10 mm and preferably about 1–3 mm and the length thereof is about 20 mm, for example. Accordingly, the number of phosphor particles in one radiation detector is about 300,000, though it may vary depending on the particle size. Although individual phosphor particles may possibly be slightly different from one another in characteristics, the dispersion in the characteristics as scintillator can be made about one divided by the square root of particle number, that is, about 0.01%, by sufficiently mixing them, whereby a satisfactory result can be obtained. A radiation detector resembling to the above-mentioned one is also disclosed in Japanese Patent Appln. Kokai (Laid-Open) No. 90089/79.

As a process for forming a thin layer of phosphor powder, there has been employed, for example, a process wherein a phosphor powder is suspended in a polymer solution, and the resulting suspension is placed in a mold having a desired shape and then dried. But this process had defects in that voids are easily formed in the resulting thin layer and a packing density of the thin layer cannot be increased. In the case of another process wherein a monomer solution was used in place of the polymer solution and the polymerization reaction was conducted at the time of molding, said process had almost the same defects as mentioned above as well as other defects such as a much more time being necessary for the polymerization reaction, the desired shape used in a radiation detector being not able to be formed in a mold from the beginning, and a large block having to be formed first, followed by cutting and polishing to give the desired shape, which results in making the cut and polished face lower in emission efficiency. There has also been employed a process wherein a phosphor powder and a polymer powder are mixed, charged in a molding machine and formed into a powder layer with heating and/or under pressure. This process was considerably good when a mixing ratio of the phosphor to the polymer was small, but when the mixing ratio of the phosphor to the polymer became large in order to increase the packing density of the phosphor powders, a uniform mixture could not be obtained due to a large difference in specific gravities of the two, which results in unfavorably giving ununiform molded articles having high polymer contents locally and having some weak portions. It has also been proposed a process wherein a phosphor powder was fired to give a thin film, but when a phosphor, $Gd_2O_2S:Pr,Ce,F$, which is suitable as scintillator, was fired in air, emission efficiency of the resulting thin layer was lowered undesirably.

SUMMARY OF THE INVENTION

It is an object of this invention to provide a process for forming a phosphor powder layer which is high in packing density of the phosphor powder and is also stiff.

This invention provides a process for forming a phosphor powder layer which comprises a step of mixing a phosphor powder with a polymer emulsion and drying the mixture to give the phosphor powder coated with the polymer and a step of subjecting the phosphor powder coated with the polymer to heating and pressing.

DETAILED DESCRIPTION OF PREFERRED EMBODIMENTS

Since the polymer emulsion is used in the process of this invention, the mixing of the phosphor powder with the polymer as a binder is uniform, the kind and amount of polymer emulsion can be selected freely, and pulverizing of the mixture after drying can be conducted easily.

As the polymer emulsion, there can be used emulsions of polymers such as polyvinyl chloride, polyvinyl acetate, polystyrene, polyacrylates, polyvinylpyridine, polybutadienes, etc. Since these emulsions are mainly aqueous polymer emulsions, there are no danger in working and no injury to health. It is also possible to use two or more polymer emulsions simultaneously. But it is not preferable to use two or more polymer emulsions which break emulsion by mixing them, for example, mixing a cationic polymer emulsion and an anionic polymer emulsion. Therefore, when the two or more polymer emulsion are used simultaneously, the resulting mixed system should maintain the emulsified state. Among various polymer emulsions mentioned above, the use of an emulsion of polystyrene is more preferable. Since polystyrene shows little deterioration when exposed to X-rays, there is no problem in the life when used as scintillator.

The mixture of phosphor powder and polymer emulsion is then dried by a conventional method to give the phosphor powder coated with the polymer.

The phosphor powder coated with the polymer is placed in a mold machine and molded under a pressure of from 4–5 $kg/cm^2$ to 500–600 $kg/cm^2$ with heating at a temperature of the glass transition temperature or melting point of the polymer coating the phosphor powder or higher to form a phosphor powder layer. In order to prevent the phosphor from deterioration, it is preferable to keep the heating temperature at 300° C. or lower, more preferably 200° C. or lower. It is also possible to mold the phosphor powder under pressure with heating or by giving pressure first, followed by heating without pressure.

According to this invention, the molding can be conducted in a short time and the resulting molded layer is uniform in quality without voids. In this invention, a conventional molding machine can be used.

The amount of polymer emulsion is preferably in the range of 4 to 33% by weight, more preferably 6 to 15% by weight, in terms of solid content based on the weight of the phosphor powder. If the solid content is less than 4% by weight, the effect as a binder is insufficient and sufficient strength cannot be obtained. On the other hand, if the solid content is more than 33% by weight, the packing density is lowered and it becomes difficult to release a molded layer from the molding machine. In order to increase the packing density, the solid content of 15% by weight or less is particularly preferable.

As the phosphor powder used as scintillator in a radiation detector, particularly in a radiation detector used in X-ray CT, it is preferable to use phosphor powder having an average particle size of 5 to 50 $\mu$m. In such a case, there can easily be obtained a phosphor powder layer with a high packing density and desired strength. The above-mentioned particle size of 5 to 50 $\mu$m is not limitative one but only shows a practically preferable range. It is also possible to use phosphor powders having an average particle size in the range of 1 to 200 $\mu$m.

As the phosphor powder, there can be used a powder of at least one phosphor selected from the group consisting of phosphors of $Y_2O_2S$, $La_2O_2S$, $Gd_2O_2S$, or $BaSO_4$ activated with at least one of Eu, Pr and Tb, and other phosphors such as CdS:Cu,Al, CdS:Ag,Cl, ZnS:Cu,Al, ZnCdS:Cu,Al and ZnCdS:Ag,Cl. Among them, $Gd_2O_2S$:Pr,Ce,F is more preferable.

The phosphor powder layer formed by the process of this invention has many advantages compared with that obtained by the known resin mold method in that complicated procedures are not necessary, cutting and polishing for giving a suitable shape is not necessary for use in a radiation detector, and thus the emission efficiency is not lowered, since polystyrene can be used, deterioration of the scintillator layer due to X-rays can be reduced remarkably, and the like.

This invention is illustrated by way of Examples, in which all percents are by weight unless otherwise specified, and which do not limit this invention.

EXAMPLE 1

A phosphor powder, $Gd_2O_2S$:Pr,Ce,F in an amount of 20 g was sufficiently mixed with 3.5 g of a polystyrene emulsion (Nipol LX-303, a trade name, manufactured by The Japanese Geon Co., Ltd., solid content 45%) and dried in vacuum. The amount of polystyrene was 7.9% based on the weight of the phosphor powder. Subsequently, the dried product was pulverized by softly pressing with a pestle. The resulting powder was filled in a frame made of ceramic (size 2 mm×2 mm×40 mm) and pressed with a punch made of ceramic at a pressure of about 10 kg/cm², followed by heating on a hot plate at 120° C. for 5 minutes. The resulting phosphor powder layer had no voids and sufficient strength and was uniform in quality.

EXAMPLE 2

A phosphor powder, $Gd_2O_2S$:Pr,Ce,F, in an amount of 20 g was sufficiently mixed with 6 g of a polystyrene emulsion (Nipol LX-303, solid content 45%) and dried in vacuum. The amount of polystyrene was 13.5% based on the weight of the phosphor powder. Subsequently, the dried product was pulverized by softly pressing with a pestle. The resulting powder was filled in a frame made of ceramic (size 2 mm×2 mm×40 mm) and pressed with a punch made of ceramic at a pressure of about 10 kg/cm², followed by heating on a hot plate at 120° C. for 5 minutes. The resulting phosphor powder (scintillator) layer was uniform in quality without voids and had sufficient strength.

EXAMPLE 3

A phosphor powder, $Gd_2O_2S$:Pr,Ce,F, in an amount of 20 g was sufficiently mixed with 1.8 g of a polystyrene emulsion (NiPol LX-303, solid content 45%) and dried in vacuum. The amount of polystyrene was 4% based on the weight of the phosphor powder. Subsequently, a scintillator layer was obtained in the same manner as described in Example 2. The resulting scintillator layer was uniform in quality without voids and had sufficient strength.

EXAMPLE 4

A phosphor powder, $Gd_2O_2S$:Pr,Ce,F, in an amount of 20 g was sufficiently mixed with 8 g of a polystyrene emulsion (Nipol LX-303, solid content 45%) and dried in vacuum. The amount of polystyrene was 18% based on the weight of the phosphor powder. Subsequently, a scintillator layer was obtained in the same manner as described in Example 2. The resulting scintillator layer was uniform in quality without voids and had sufficient strength.

EXAMPLE 5

A phosphor powder, $Gd_2O_2S$:Pr,F,Ce, in an amount of 20 g was sufficiently mixed with 6 g of a polyacrylate emulsion (Nipol LX-851, a trade name, manufactured by The Japanese Geon Co., Ltd., solid content 45%) and dried in vacuum. The amount of polyacrylate was 13.5% based on the weight of the phosphor. Subsequently, a scintillator layer was obtained in the same manner as described in Example 2. The resulting scintillator layer was uniform in quality without voids and had sufficient strength.

EXAMPLE 6

A phosphor powder, $Gd_2O_2S$:Pr,F,Ce, in an amount of 20 g was sufficiently mixed with 5.1 g of a polyvinyl chloride emulsion (Geon 151, a trade name, manufactured by The Japanese Geon Co., Ltd., solid content 53%) and dried in vacuum. The amount of polyvinyl chloride was 13.5% based on the weight of the phosphor. Subsequently, the dried product was pulverized by softly pressing with a pestle. The resulting powder was filled in a frame made of ceramic (size 2 mm×2 mm×40 mm) and heated on a hot plate at 200° C. for 5 minutes, while pressing with a punch made of ceramic at a pressure of about 10 kg/cm². The resulting scintillator layer was uniform in quality without voids and had sufficient strength.

What is claimed is:

1. A process for forming a phosphor powder layer which comprises a step of mixing a phosphor powder with a polymer emulsion, said polymer emulsion having a solid content of 4 to 33% by weight based on the weight of the phosphor powder, a step of drying the mixture, a step of pulverizing the resulting dried mixture to give the phosphor powder coated with a polymer, and a step of molding the phosphor powder coated with the polymer in a mold under pressure and heat.

2. A process according to claim 1, wherein the polymer emulsion is an emulsion of at least one polymer selected from the group consisting of polyvinyl chloride, polyvinyl acetate, polystyrene, polyacrylates, polyvinylpyridine and polybutadienes.

3. A process according to claim 1, wherein the polymer emulsion has a solid content of 6 to 15% by weight.

4. A process according to claim 1, wherein the phosphor powder has an average particle size of 5 to 50 μm.

5. A process according to claim 1, wherein the heating is conducted at a temperature of the glass transition temperature or melting point of the polymer or higher.

6. A process according to claim 1, wherein the phosphor powder is a powder of at least one phosphor selected from the group consisting of phosphors of $Y_2O_2S$, $La_2O_2S$, $Gd_2O_2S$ or $BaSO_4$ activated with at least one of Eu, Pr and Tb, and CdS:Cu,Al, CdS:Ag,Cl, ZnS:Cu,Al, ZnCdS:Cu,Al and ZnCdS:Ag,Cl.

7. A process according to claim 1, wherein the phosphor powder is a powder of $Gd_2O_2S$:Pr,Ce,F.

8. A process according to claim 5, wherein said pressing is conducted under a pressure of from 4–600 $Kg/cm^2$.

9. A process according to claim 5, wherein said heating is conducted at a temperature of 300° C. or lower, but at least said temperature of the glass transition temperature of melting point of the polymer.

10. A process for forming a phosphor powder layer for a scintillator in a radiation detector, which comprises:
 (a) mixing a phosphor powder with a polymer emulsion, said polymer emulsion having a resin solid content of 4 to 33% by weight based on the weight of the phosphor powder;
 (b) drying the mixture;
 (c) pulverizing the resulting dried mixture to give a phosphor powder coated with the polymer; and
 (d) subjecting the phosphor powder coated with the polymer to heating and pressing in a mold, whereby a phosphor powder layer having sufficient strength and having a sufficiently large packing density such that said layer can be used for a scintillator in a radiation detector is formed.

11. A process according to claim 10, wherein said subjecting the phosphor powder coated with the polymer to heating and pressing is conducted by first subjecting the phosphor powder coated with the polymer to pressure and then to heating without pressure.

12. A process for forming a phosphor powder layer which comprises a step of mixing a phosphor powder with a polystyrene emulsion, said polystyrene emulsion having a solid content of 4 to 33% by weight based on the weight of the phosphor powder, a step of drying the mixture, a step of pulverizing the resulting dried mixture to give the phosphor powder coated with polystyrene, and a step of molding the phosphor powder coated with the polystyrene in a mold under pressure and heat.

13. A process according to claim 10, wherein the polymer emulsion is an emulsion of at least one polymer selected from the group consisting of polyvinyl chloride, polyvinyl acetate, polystyrene, polyacrylates, polyvinylpyridine and polybutadienes.

* * * * *